(12) United States Patent
Leong et al.

(10) Patent No.: US 9,069,527 B2
(45) Date of Patent: Jun. 30, 2015

(54) TABLET SUPPORT APPARATUS

(71) Applicant: Brydge LLC, Menlo Park, CA (US)

(72) Inventors: Bradley Train Leong, Atherton, CA (US); Edward Guillaume Helene Vromen, East Palo Alto, CA (US)

(73) Assignee: Brydge LLC, San Jose, CA (US)

( * ) Notice: Subject to any disclaimer, the term of this patent is extended or adjusted under 35 U.S.C. 154(b) by 180 days.

(21) Appl. No.: 13/657,277

(22) Filed: Oct. 22, 2012

(65) Prior Publication Data

US 2014/0029185 A1 Jan. 30, 2014

Related U.S. Application Data (60) Provisional application No. 61/741,696, filed on Jul. 26, 2012.

(51) Int. Cl.
*G06F 1/16* (2006.01)

(52) U.S. Cl.
CPC ............ *G06F 1/1626* (2013.01); *G06F 1/1632* (2013.01); *G06F 1/1669* (2013.01)

(58) Field of Classification Search
CPC ........................................................ G06F 1/16
USPC ........................................ 361/679.08, 679.57
See application file for complete search history.

(56) References Cited

U.S. PATENT DOCUMENTS

| | | |
|---|---|---|
| 5,196,991 A | 3/1993 | Hsieh |
| 5,264,992 A | 11/1993 | Hogdahl et al. |
| 5,507,072 A | 4/1996 | Youn |
| 6,198,625 B1 * | 3/2001 | Leman ................. 361/679.27 |
| 6,219,681 B1 | 4/2001 | Hawkins et al. |
| 6,304,431 B1 * | 10/2001 | Kim ..................... 361/679.09 |
| D485,271 S | 1/2004 | Kamegi |
| 6,700,775 B1 | 3/2004 | Chuang et al. |
| D491,182 S | 6/2004 | Sheehan et al. |
| 6,822,524 B2 | 11/2004 | Hempel et al. |
| D502,706 S | 3/2005 | Skeehan et al. |
| D503,714 S | 4/2005 | Tritschler et al. |
| D503,936 S | 4/2005 | Tritschler et al. |
| 6,937,468 B2 * | 8/2005 | Lin et al. ............. 361/679.41 |
| 6,952,340 B2 | 10/2005 | Son et al. |
| D543,550 S | 5/2007 | Raeber et al. |
| 7,477,508 B1 | 1/2009 | Pilkington et al. |
| 7,502,225 B2 * | 3/2009 | Solomon et al. ...... 361/679.41 |
| D598,451 S | 8/2009 | Andre et al. |
| D604,300 S | 11/2009 | Andre et al. |
| D608,783 S | 1/2010 | Lee |
| 7,643,274 B2 | 1/2010 | Bekele |
| 7,672,120 B2 | 3/2010 | Kohlman et al. |
| 7,719,826 B1 | 5/2010 | Chang et al. |

(Continued)

FOREIGN PATENT DOCUMENTS

CN 202133962 U 2/2012

*Primary Examiner* — Timothy Thompson
*Assistant Examiner* — Rashen E Morrison
(74) *Attorney, Agent, or Firm* — Lerner, David, Littenberg, Krumholz & Mentlik, LLP (57) ABSTRACT

An apparatus for supporting a tablet type computer includes a keyboard, a frame and clamps pivotally connected to the frame by hinges. Each clamp has first and second clamping fingers. The apparatus can further include inserts configured to cover at least a portion of the clamping fingers. The inserts releasably grip portions of the tablet-type computer when the portions of the tablet-type computer are inserted between the clamping fingers.

24 Claims, 6 Drawing Sheets

(56) References Cited

U.S. PATENT DOCUMENTS

| | | |
|---|---|---|
| 7,990,693 B2 * | 8/2011 | Nakajima ................ 361/679.09 |
| 8,009,143 B2 | 8/2011 | Huang |
| D649,549 S | 11/2011 | Andre et al. |
| 8,159,414 B2 | 4/2012 | Pate et al. |
| D659,139 S | 5/2012 | Gengler |
| D659,143 S | 5/2012 | Akana et al. |
| 8,416,568 B2 * | 4/2013 | Tian et al. ................ 361/679.55 |
| 2005/0111182 A1 | 5/2005 | Lin et al. |
| 2005/0168925 A1 * | 8/2005 | Fang et al. .................... 361/683 |
| 2006/0256511 A1 | 11/2006 | Ma |
| 2009/0047053 A1 | 2/2009 | Monney et al. |
| 2009/0251417 A1 | 10/2009 | Pate et al. |
| 2010/0064475 A1 * | 3/2010 | Wang et al. .................... 16/232 |
| 2010/0238620 A1 | 9/2010 | Fish |
| 2011/0051345 A1 | 3/2011 | Watabe et al. |
| 2011/0167181 A1 | 7/2011 | Minoo et al. |
| 2011/0199726 A1 | 8/2011 | Moser |
| 2011/0199727 A1 | 8/2011 | Probst |
| 2011/0222238 A1 | 9/2011 | Staats et al. |
| 2012/0057288 A1 | 3/2012 | Chou et al. |
| 2012/0080577 A1 | 4/2012 | McIntyre et al. |
| 2012/0099264 A1 | 4/2012 | Degner et al. |
| 2012/0106062 A1 | 5/2012 | Probst et al. |
| 2012/0106078 A1 * | 5/2012 | Probst et al. ............. 361/679.56 |
| 2012/0111881 A1 | 5/2012 | Gaddis, II et al. |
| 2012/0113579 A1 | 5/2012 | Agata et al. |
| 2013/0301201 A1 * | 11/2013 | Hsu et al. ................ 361/679.09 |

* cited by examiner

TABLET SUPPORT APPARATUS

CROSS-REFERENCE TO RELATED APPLICATIONS

The present application claims the benefit of the filing date of U.S. Provisional Patent Application No. 61/741,696 filed Jul. 26, 2012, the disclosure of which is hereby incorporated herein by reference.

BACKGROUND OF THE INVENTION

Tablet style hand held computers are becoming more popular with the coming of wireless media. Often times a user is sitting down during business travel, in class or at home and must simply lay the tablet down on a table top. In order to use the device the tablet is simply held in a user's hand and uncomfortably operated like a cell phone or used while resting on a surface at an undesirable angle. Many of these devices have no physical keyboard and rely on a virtual keyboard operated on a touch screen of the device. Devices that do have physical keyboards often have keyboards that are small and difficult to operate.

Some accessories for tablet style hand held computers allow for the tablet to be connected to a support device that includes a physical keyboard. There is a need for a device that allows for attaching a tablet to a keyboard securely, without either encasing major parts of the tablet or resting it on a built-in ledge, relying on gravity to keep the tablet in place. The first option covers the aesthetics of the tablet and takes significant effort to connect the two devices. The second option offers no positioning options, or very limited positioning options, and does not securely attach the tablet to the keyboard. Often, these keyboards are bulky and not easily removed from the tablet.

With the ever increasing popularity of touch screen hand held electronic devices there is now a demand for accessories for supporting the devices on horizontal surfaces used while sitting down at home, at work, in class, or for use during travel. As such, improvements in support apparatus to securely connect a tablet-type computer to a keyboard, while still allowing multiple and/or infinitely adjustable viewing angles, displaying the aesthetics of the tablet, and providing keyboard functionality are desirable.

BRIEF SUMMARY OF THE INVENTION

In one embodiment of the invention, an apparatus for supporting a device includes a keyboard, a frame, and a device receiving member connected to the frame. The device receiving member includes clamp surfaces configured to receive a portion of the device. The apparatus can include additional device receiving members pivotally connected to the frame which include clamp surfaces configured to receive a portion of the device.

The apparatus can further include one or more inserts configured to mate with the device receiving members. The inserts at least partially sit within the device receiving members and provide a contact surface to grip the device. The inserts can include textured surfaces, such as vertical or horizontal ridges. The inserts can be formed of materials such as plastic, silicone, or rubber. The frame can be formed of materials such as metal, including aluminum, or plastic. The clamps can be formed of metal, such as aluminum, or plastic. The inserts can have a flange forming a recess to receive the first and second clamp surfaces. The bottom surface of the frame can include a first depression for mounting the first device receiving member to the frame and a second depression for mounting the second device receiving member to the frame. The top surface of the frame can include a first depression shaped to receive a portion of the first device receiving member and a second depression shaped to receive a portion of the second device receiving member.

Each clamp can include a hinge having a shaft, a support plate, and a female host. The female host is configured to receive the shaft. The shaft can be generally cylindrical with a first and second flattened portion. The female host can be generally cylindrical with a first and second flattened portion. The flattened portions on the shaft and host can be positioned approximately 90° from each other.

The device receiving members can each include a rounder base portion, and each device receiving member is capable or rotating between and open position and a closed position. The rounded base portion of each device receiving member protrudes beyond a bottom portion of the frame when in the open position but does not protrude beyond the bottom portion of the frame when in the closed position.

In another embodiment of the invention, an apparatus for supporting a tablet type computer includes a keyboard, a frame, and first and second tablet receiving members pivotally connected to the frame by hinges. The tablet receiving members include first and second clamp surfaces configured to receive a portion of the tablet. The hinges include a locking mechanism having an engaged state and a disengaged state. Upon rotation of the tablet receiving members about the frame, the hinges provide a first amount of friction when the locking mechanism is in the disengaged state. When the locking mechanism is in the engaged state, the hinges provide a second amount of friction. The second amount of friction is greater than the first amount of friction.

The apparatus can include plurality of inserts, each insert being configured to slip over a tablet receiving member and being configured to provide a compression fit with the tablet when the tablet is received within the tablet receiving members. Each tablet receiving member can include a rounded base portion. The tablet receiving members are capable of rotation between a closed position and an open position. The rounded base portion of each tablet receiving member protrudes beyond a bottom portion of the frame when in the open position but does not protrude beyond the bottom portion of the frame when in the closed position.

The apparatus can include a speaker and one or more wireless modules in the frame. The wireless modules are configured to transmit information between the keyboard and the tablet and/or the speaker and the tablet.

In yet another embodiment of the invention, an apparatus for supporting a tablet type computer includes a keyboard, a frame and tablet receiving members pivotally connected to the frame by hinges. Each tablet receiving member has first and second clamping fingers. The apparatus can further include inserts configured to cover at least a portion of the clamping fingers. The inserts releasably grip portions of the tablet type computer when the portions of the tablet type computer are inserted between the clamping fingers of the clamps. The first and second clamping fingers of each tablet receiving member are joined at a rounded base portion. Each tablet receiving member is capable of rotation between a closed position and an open position, the rounded base portion of each tablet receiving member protruding beyond a bottom portion of the frame when in the open position but not protruding beyond the bottom portion of the frame when in the closed position.

DETAILED DESCRIPTION

While the present invention will be described more fully hereinafter with reference to the accompanying drawings, in which particular embodiments of a keyboard support apparatus for a tablet computer are shown, it is to be understood at the outset that persons skilled in the art may modify the invention herein described while achieving the functions and results of this invention. Accordingly, the descriptions that follow are to be understood as illustrative and exemplary of specific structures, aspects and features within the broad scope of the present invention and not as limiting of such broad scope. Like numbers refer to similar features of like elements throughout.

Figure 1:
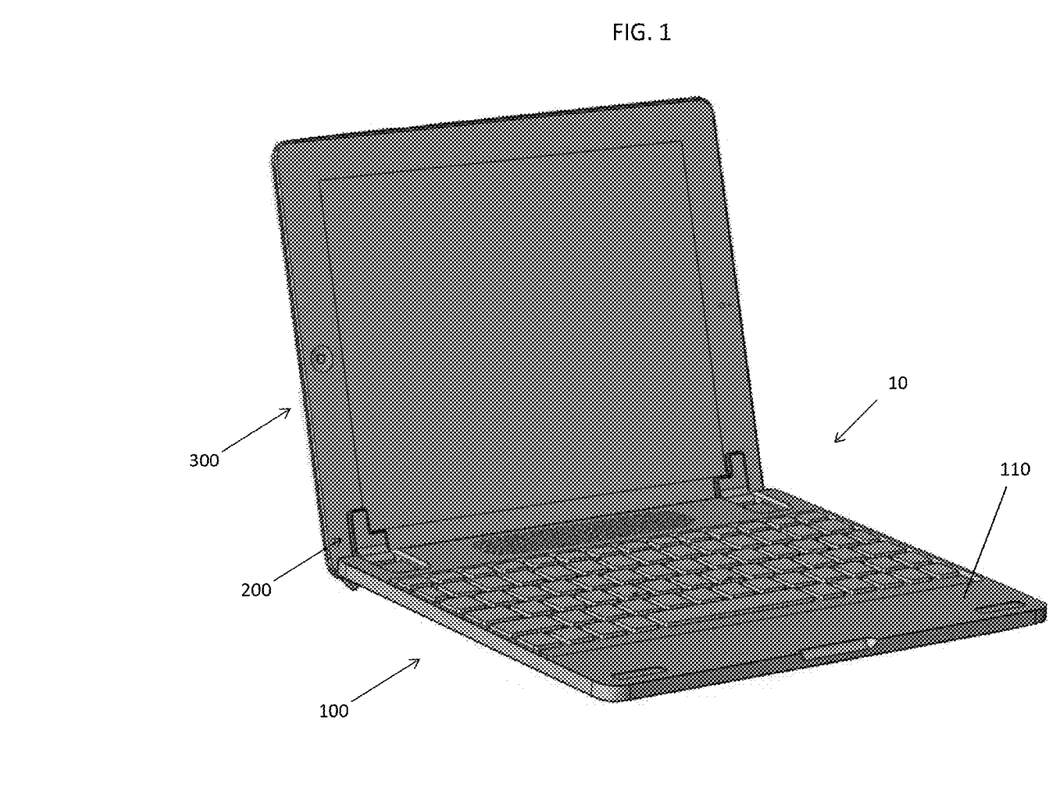
FIG. 1 illustrates a perspective view of a tablet support apparatus and a tablet coupled thereto.

An embodiment of a tablet support apparatus 10 according to the present invention includes a keyboard 100 and tablet receiving member 200. As shown in FIG. 1, the tablet support apparatus 10 is capable of safely and securely receiving and supporting a tablet 300. In one respect, the tablet support apparatus 10 acts to combine with a tablet 300 to provide similar functionality to a notebook computer. Generally, the tablet support apparatus 10 supports the tablet 300 on a generally horizontal surface such as a countertop, desk, or hideaway tray, allowing the tablet 300 to move through a range of angles with respect to the horizontal surface. The tablet 300 can be quickly inserted into the tablet support apparatus 10 without requiring any additional connecting parts. Although the embodiment of FIG. 1 shows a tablet computer 300 being supported, other devices can also be supported by the tablet support apparatus 10, including, for example, hand held computers, electronic books, e-readers, and portable cell phones.

Figure 2:
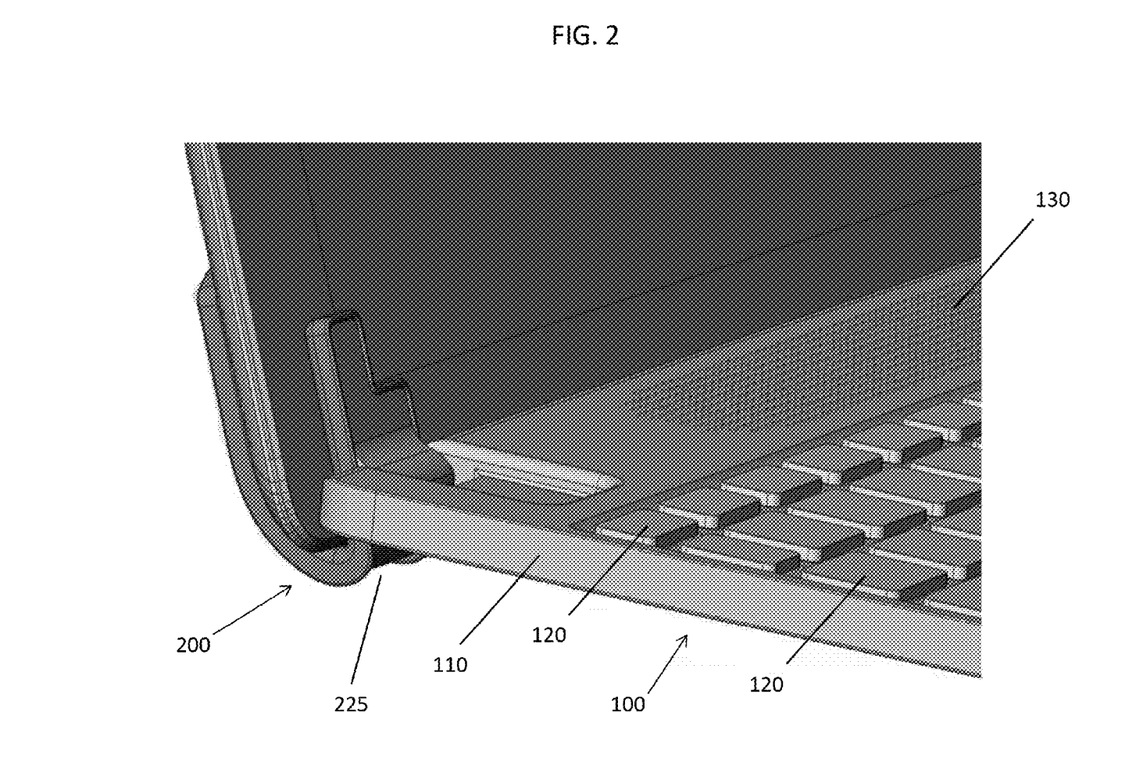
FIG. 2 illustrates an enlarged partial perspective view of the tablet support apparatus of FIG. 1.

Turning to the keyboard 100, as shown in FIGS. 1 and 2, the keyboard includes a frame 110 and keys 120. The keyboard 100 may include one or more wireless modules (not illustrated) and one or more speakers 130. One wireless module, which may for example be Bluetooth, can provide communication between the keyboard 100 and the tablet 300. One wireless module, which also may for example be Bluetooth, can provide communication between the speakers 130 and the tablet 300. Alternately, a single wireless module can provide for communication between the tablet 300 and both the keyboard 100 and speaker 130 by multiplexing. Wireless modules in the keyboard 100 can otherwise connect to any types of devices, for example, wireless modules may provide a connection to a printer or other accessory. The type or types of wireless modules included in the keyboard 100 are largely a matter of design choice and can alternately include, for example, any wireless communication in the RF spectrum. The keyboard 100, or more generally the tablet support apparatus 10, can include any number of additional features often seen, for example, in computers or other electronic devices, such as CD/DVD drives and track pads.

In addition or alternatively to wireless modules, connections between the keyboard 100 and tablet 300 and connections between the speakers 130 and tablet 300 may be wired connections. For example, the tablet support apparatus 10 can include one or more of a variety of connection options, including, but not limited to USB, micro-USB, 30-pin and 8-pin dock connectors. These connection options can provide the ability to create a wired connection between the tablet support apparatus 10 and the tablet 300. These connection options can also provide the ability to connect to a power source to, for example, charge an internal battery (not shown) in the tablet support apparatus 10. In embodiments that allow for a wired connection between the tablet support apparatus 10 and the tablet 300, the keyboard 100 can include one or more batteries (not shown) such that the tablet support apparatus 10 can provide additional charge to the tablet 300 through the wired connection, or vice versa.

Figure 3:
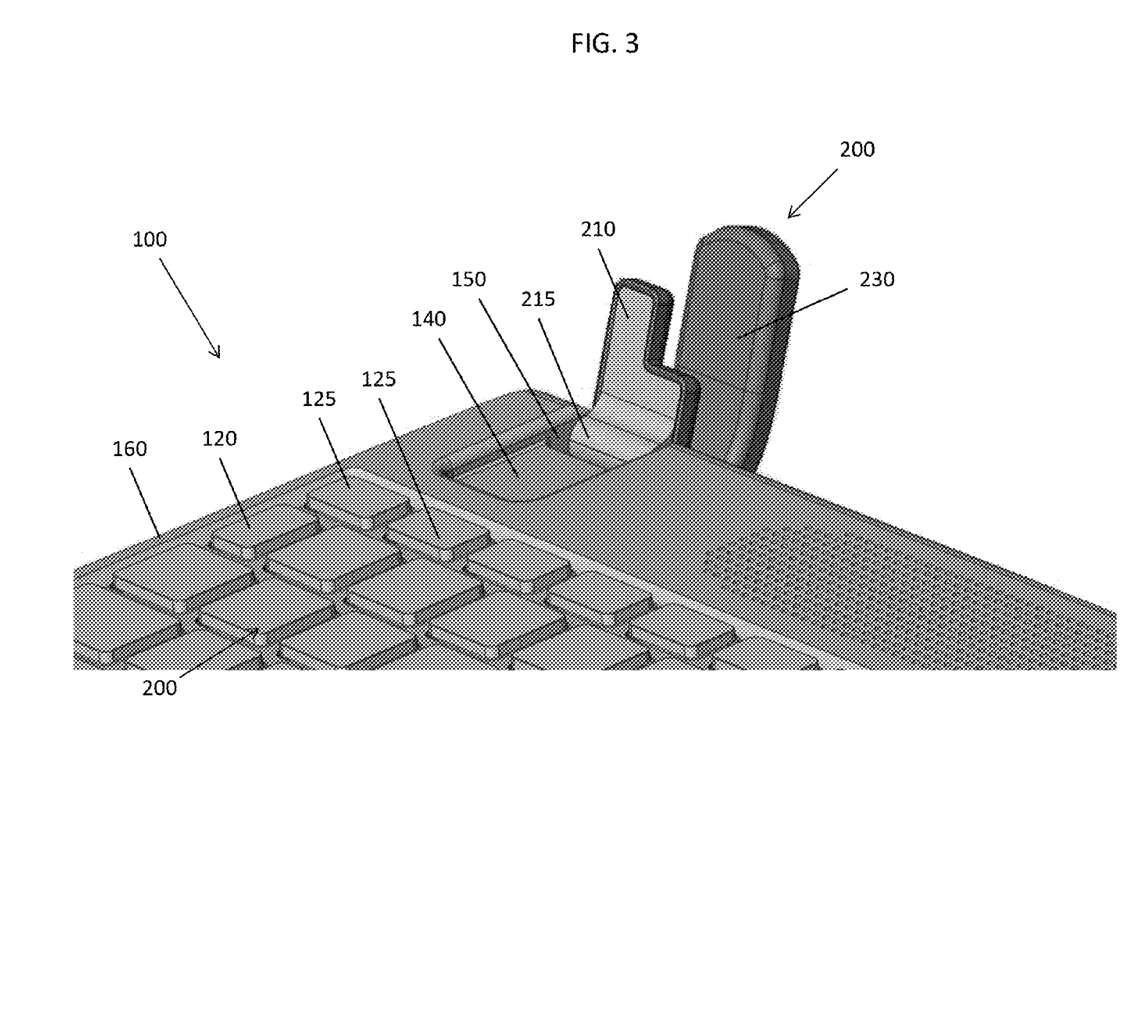
FIG. 3 illustrates an enlarged partial perspective view of the tablet support apparatus of FIG. 1 without the tablet.
Figure 4:
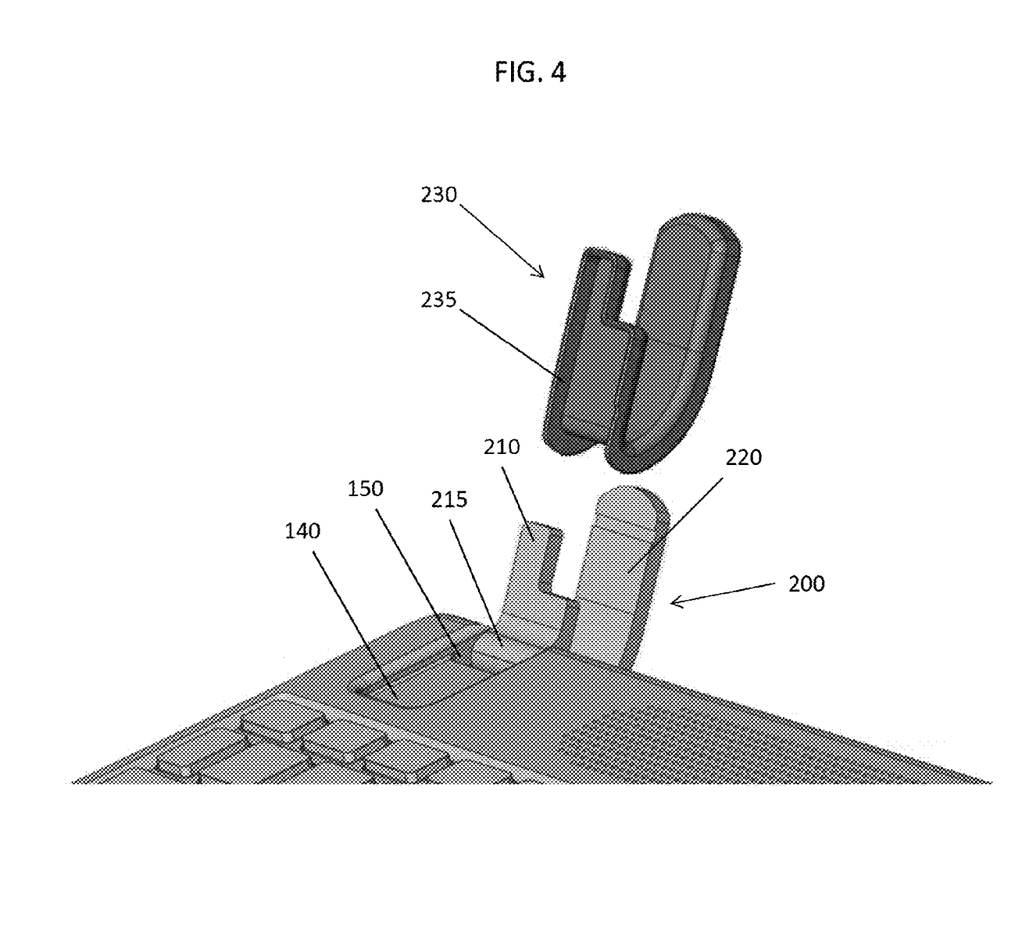
FIG. 4 illustrates the tablet support apparatus of FIG. 3 in an exploded view.
Figure 6:
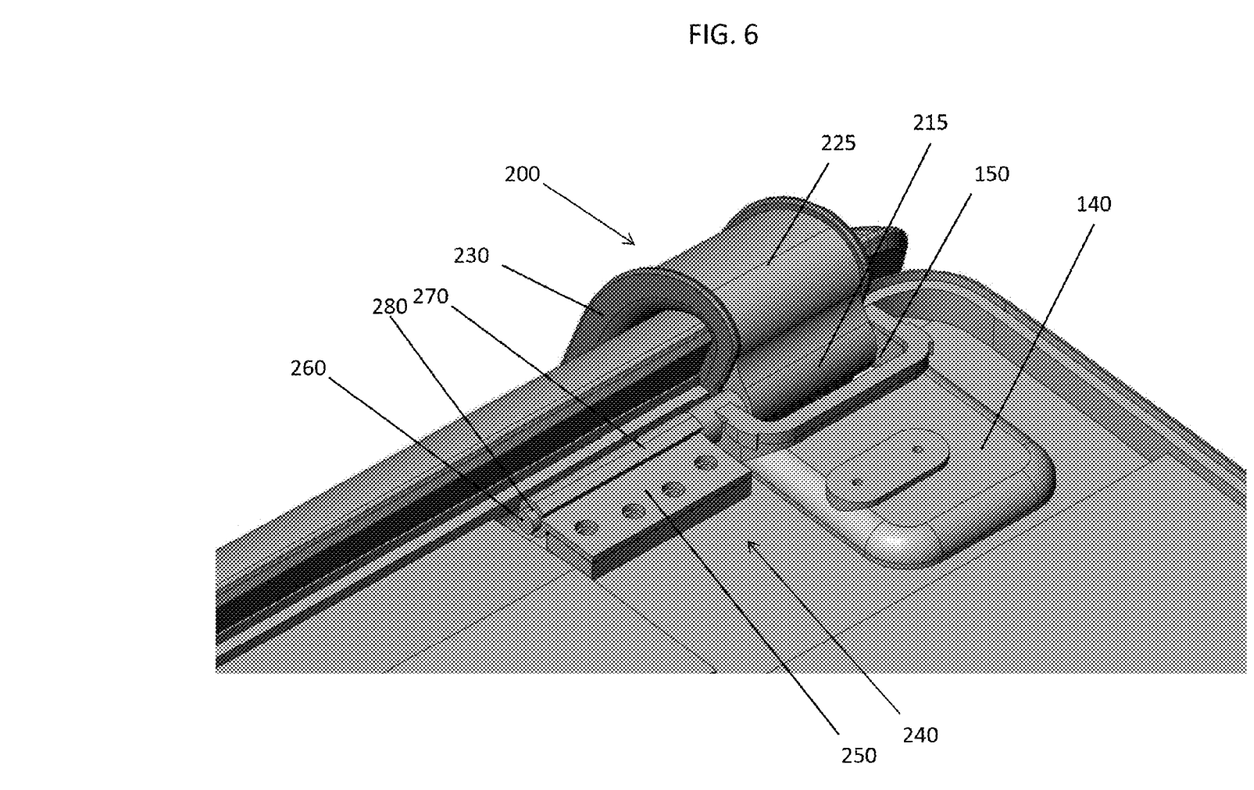
FIG. 6 illustrates a perspective cut-away view of the bottom of a tablet support apparatus.

The frame 110 may further include one or more depressions 140 and cutout portions 150, as best illustrated in FIGS. 3, 4 and 6. The depressions 140 and cutout portions 150 are described more fully below in connection with the tablet receiving members 200. In the embodiment illustrated in FIG. 1, the frame 110 is made from anodized aluminum. Other materials are suitable for the frame 110, including but not limited to plastics or other metal alloys, and is largely a matter of design choice. Particularly, the material for frame 110 can be chosen to substantially match the material of which a tablet 300 is made to create an aesthetic look in which the tablet support apparatus 10 blends with the tablet 300.

In the embodiment shown in FIG. 1, the keyboard 100 is a full QWERTY keyboard. The beveled edges 160 of the frame 110 between the far edges of the frame and the outermost keys 120, as best seen in FIG. 3, is preferably thin to provide as much space for the keys as possible within the dimensions of the frame. Additionally, keyboard 100 may include dedicated hotkeys 125 that correspond to specific functions of a tablet 300. For example, for tablets that produce sound, the keyboard 100 can include hotkeys 125 for increasing volume, decreasing volume, and muting volume. For tablets 300 that have media player functionality, the keyboard 100 can include hotkeys 125 for playing, pausing, stopping, and otherwise accessing media on the tablet 300. Still other hotkeys 125 on the keyboard 100 can launch specific applications such as internet browsers or word processing programs. Hotkeys 125 may also be included for changing the settings of the tablet 300. For example, hotkeys 125 on the keyboard 100 may increase or decrease the brightness of the display of the tablet 300, or provide for the ability to toggle between two or more languages or keyboard settings on the tablet. For example, in tablets that allow for multiple keyboard layouts, a keyboard toggle hotkey 125 can allow a user to switch from a QWERTY keyboard layout to a QWERTZ keyboard layout. After using a hotkey 125 to toggle from a QWERTY keyboard layout to a QWERTZ keyboard layout, although the physical keyboard 100 does not change, the input corresponding to the same physical keys 120 will correspond with the QWERTZ keyboard. A major change of the QWERTZ keyboard layout from the QWERTY keyboard layout is that the position of the "Y" and "Z" keys are switched. Thus, after using a hotkey 125 to toggle from the QWERTY keyboard layout to the QWERTZ keyboard layout, pressing the physical "Y" key on the keyboard 100 will result in the letter "Z" being produced on the tablet 300. Although only two keyboard layouts are discussed above, the number of keyboard layouts and languages available depends only on the capabilities of the tablet 300 connected to the tablet support apparatus 10. More generally, the inclusion and choice of specific hotkeys 125 is also largely a matter of design choice and is limited only by the capabilities of the tablet 300 that is connected to the tablet support apparatus 10.

Mounted on the keyboard 100 is one or more tablet receiving members 200. As best seen in FIGS. 2-5, each tablet receiving member 200 is in the form of front and back clamping fingers 210, 220 respectively. In the illustrated embodiment, each tablet receiving member 200 is generally a "U"-shaped member, each end of the "U"-shape being a clamping finger. The front clamping finger 210 includes a generally cylindrically shaped boss 215 for use with a hinge 240, described more fully below. The tablet receiving member 200, including clamping fingers 210, 220, can be integrally constructed from a single piece of material as illustrated. The back clamping finger 220 generally extends farther in the vertical direction than the front clamping finger 110, and the widest portion of the back clamping finger 220 is a similar size to the widest portion of the front clamping finger 210, although the shapes and dimensions described may be tailored for different tablets 300. The front clamping finger 210 transitions into the back clamping finger 220 at the bottom of the "U"-shape, forming a rounded base 225.

Each pair of front and back clamping fingers 210, 220 act to receive and safely and securely grip and support a portion of a tablet 300. The clamping fingers 210, 220 can provide, for example, a pressure fit or can be biased toward each other. The clamping fingers 210, 220 can be formed from the same material as the frame 110, such as aluminum, or can be formed of other materials, such as plastic. Plastic clamping fingers 210, 220 can also be glass reinforced.

Figure 5:
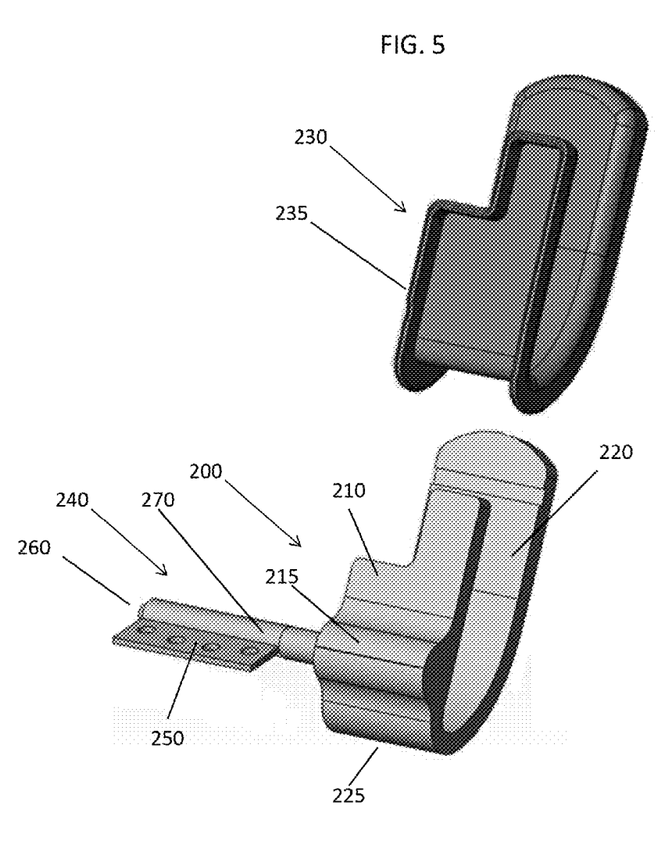
FIG. 5 illustrates an exploded perspective view of a clamp and a clamp insert.

One or more inserts 230 may be provided for each tablet receiving member 200. The inserts 230, as best seen in FIGS. 3-5, can be slipped over or otherwise attached to a pair of front and back clamping fingers 210, 220. In the illustrated embodiment, the insert 230 is complementarily shaped to the tablet receiving member 200, generally forming a "U"-shape. The insert 230 is also constructed from a single piece of material. To aid in attachment to the tablet receiving member 200, the insert 230 includes a flange 235, extending along the full perimeter of the insert, that projects orthogonally from the insert. Although the specific embodiment illustrated includes a flange 235 extending along the full perimeter of the insert 230, other embodiments are contemplated, such as flanges that extend across a partial perimeter of the insert. Similarly, inserts 230 can alternatively include sleeve-type flanges, in which portions of the front and/or back clamping finger 210, 220 of the tablet receiving member 200 are completely surrounded by an insert. Alternatively, inserts 230 can be formed without any flanges, and instead include an adhesive to permanently or semi-permanently fix the inserts to the tablet receiving members 200. Such an adhesive may also be used with inserts 230 that include flanges.

One purpose of the inserts 230 is to change the width of space between the clamping fingers 210, 220 to support tablets 300 of different thicknesses. In other words, a tablet 300 of a given size may fit securely in the clamping fingers 210, 220 without any inserts 230. However, a thinner tablet 300 would not be held as securely. For the thinner tablet 300, a user could attach an insert 230 of a certain thickness such that the thinner tablet would fit snugly and securely within the space of the clamping fingers 210, 220 because of the additional thickness provided by the insert 230. A range of inserts of different thicknesses and shapes can be provided based on the design of the tablet 300 to be held by the clamping fingers 210, 220. This allows a single tablet support apparatus 10 to securely support tablets 300 of multiple sizes, requiring only the inserts 230 to be swapped.

Additionally, the inserts 230 can be constructed of plastic, silicone, rubber or other materials, preferably resilient materials or elastomers with low durometer. A soft, cushioned, and/or compressible material is preferred such that the inserts 230 will not scratch, scuff, or otherwise damage the tablet 300 being supported by the inserts. These materials are also preferred to provide a "spring loaded" fit between the inserts 230 and a tablet 300 inserted therein. In other words, the inserts 230 preferably provide a compression fit for the tablet 300. The inserts 230 may further include textured surfaces, such as vertical or horizontal ridges (not illustrated) to increase the amount of friction between the tablet 300 and the inserts. Inserts 230 may also include adhesive, such as double-sided tape on the surfaces facing the pair of clamping fingers 210, 220 to help provide a semi-permanent connection.

The interior shape of the inserts 230 may also be varied to fit not only tablets 300 of different thicknesses, but also to fit tablets or other devices of different shapes. For example, an insert 230 could be relatively rectangular instead of "U"-shaped on the interior surface for use with a tablet 300 with rectangular edges. Alternately to having separately sized inserts 230, the pair of clamping fingers 210, 220 could have material similar to the material of the inserts permanently or integrally formed, preferably at least on the surfaces configured to make contact with the tablet 300.

In the embodiment illustrated in FIG. 4, the front clamping finger 210 and corresponding portion of the insert 230 has an "L" shape providing a notched opening. The shape of the notched opening can correspond to the corner of a display portion of a tablet 300 such that the notched opening follows the contour of the tablet screen. This "L" shape permits, in part, the front of tablet 300 to be supported without disrupting or blocking any portion of the display available for the user to view or otherwise interact. The notched opening can be modified to correspond to different displays on different tablets 300. Preferably, the clamping fingers 210, 220 and inserts 230 are relatively thin and short compared to the tablet 300, such that the aesthetics of the tablet are not hidden by the tablet receiving members 200, while the tablet receiving members are still able to securely support the tablet or other device.

FIG. 5 illustrates an isolated tablet receiving member 200 and hinge 240 in accordance with one embodiment of the invention. The tablet receiving member 200 and hinge 240 connected to the keyboard 100 is best illustrated in FIG. 6, which shows the hinge connected to the underside of the frame 110. The hinge 240 provides for the ability of the tablet receiving member 200 and a tablet 300 received therein to rotate with respect to the keyboard 100. The hinge 240 generally includes a support plate 250, a shaft 260, and a female host 270 for receiving the shaft 260. The shaft 260 extends from the boss 215 front clamping finger 210.

The support plate 250 and female host 270 can be made from a single piece of material or can otherwise be connected such that fixing the support plate 250 to the keyboard 100 also fixes the female host 270 in place. In the embodiment shown in FIGS. 5-6, the support plate 250 is integral with the female host 270. The female host 270 in this embodiment essentially is a flat piece of metal integral with the support plate 250, the female host portion being bent into a cylindrical shape. The support plate 250 can include a plurality of apertures. The support plate apertures allow the support plate 250 and female host 270 to be fixed to the keyboard 100, for example by fasteners. Other methods of fixing the support plate 250 to the keyboard 100, such as by adhesives or soldering, may also be used.

As best seen in FIG. 6, the support plate 250 is preferably attached to the underside of the frame 110 of the keyboard 100 within a depression 115 formed in the bottom face. This point of attachment allows the connection of the support plate 250 to be internal to the keyboard 100, allowing the bottom face of the frame 110 to be smooth and sit flush on a flat surface.

As best seen in FIGS. 3-4, the top face of the frame 110 can also include depressions 140 and cutout portions 150. The cutout portions 150 are formed along the back edge of the frame 110. The cutout portions 150 are sized to receive the boss 215 of a tablet receiving member 200. Preferably, one depression 140 and one cutout portion 150 is provided for each tablet receiving member 200. In the embodiment illustrated in FIGS. 3-4, the depression 140 has a shape that generally corresponds to the shape and thickness of an end portion of the front clamping finger 210. In the embodiment shown, the depression 140 is generally rectangular. The clamping fingers 210, 220 preferably have a range of rotation from about 0° to about 180°. The mechanism of rotation is discussed in more detail below. When the clamping fingers 210, 220 are in the closed (i.e. about 0° rotation) position, the front clamping finger 210 fits within the depression 140. This allows for a tablet 300 held within the clamping fingers 210, 220, when in the closed position, to be about parallel to the keyboard 100 and with little or no space between the tablet and the keyboard, similar to a closed laptop.

As the clamping fingers 210, 220 move through a range of rotation above 0°, the rounded base portion 225 of the tablet receiving member 200 protrudes beyond the bottom portion of the frame 110. For example, if the tablet support apparatus 10 sits on a flat table and the clamping fingers 210, 220 and tablet 300 are at a 90° angle to the keyboard 100, the rounded base portion 225 of each tablet receiving member 200 provides a contact surface with the flat table near the back of the tablet support apparatus, while the bottom of frame 110 provides a contact surface near the front of the tablet support apparatus. This functions to raise the back end of the keyboard 100 with respect to the front end, providing an inclined keyboard surface for the user. On the other hand, when the tablet 300 is moved into the closed position, i.e. at about a 0° angle relative to the keyboard 100, the rounded base portion 225 will rotate from the position shown in FIG. 2. To a position facing the rear of the keyboard 100. In this position, the rounded base portion 225 of each tablet receiving member 200 does not protrude beyond the bottom portion of the frame 110. In other words, when the tablet 300 and keyboard 100 are in the closed position on a flat support surface, the bottom portion of frame 110 will mostly or entirely provide a flat contact surface with the flat support surface.

Referring to FIGS. 5-6, the shaft 260 extends through the female host 270 and into the boss 215 formed on front clamping finger 210. The shaft 260 and female host 270 provide a pressure fit such that, as the clamping fingers 210, 220 move through a range of rotation, enough friction is provided to keep the clamping fingers and a tablet 300 held therein at a given angle. To move the tablet 300 to a new angle, the user manipulates the tablet with enough force to overcome the friction provided by the pressure fit, rotating the tablet to the new desired position. The shaft 260 and female host 270 can further include one or more locking features to provide increased friction at desired points within the range of rotation. For example, FIG. 6 illustrates one locking feature 280. In this embodiment, the shaft 260 is generally cylindrical, with a portion of the shaft having a flat surface. The female host 270 similarly is generally cylindrical, with a portion of the female host being flat. These flat portions together form the locking feature 280. As the clamping fingers 210, 220 rotate, the shaft 260 rotates within the female host 270 providing a first amount of friction. As rotation continues, the flat portion of the shaft 260 eventually aligns with the flat portion of the female host 270, providing an increased second level of friction. One, two, or more locking features 280 can be provided for each hinge 240. For example, in a preferred embodiment, two locking features 280 are provided such that the second level of increased friction is engaged when the tablet 300 is at either about 0° rotation (a closed position) or at about 90° rotation. One result of choosing this combination of locking features 280 is that extra friction is provided to keep the tablet support apparatus 10 in the closed position with the tablet 300 securely in place. This could be especially useful because the tablet support apparatus is more likely to be transported while in the closed position. Another advantage of choosing this combination of locking features 280 is that a user can easily align two independent pairs of clamping fingers 210, 220 prior to inserting the tablet 300 into the clamping fingers. The user will get feedback, such as increased pressure or an audible "clicking" sound when each pair of clamping fingers 210, 220 is at about 90° rotation in the locked position. Once the user has rotated both pairs of clamping fingers 210, 220 to the same rotational position, he can be confident that the open portions of the tablet receiving members 200 both align such that the tablet 300 can be inserted therein.

The front of keyboard 100 can include a magnet (not shown). Many tablets 300 and other devices include sensors that cause the tablet to go into a power-saving "sleep" mode upon interaction with a magnet. For example, when the user is finished using a tablet 300 connected to the tablet support apparatus 10, he can rotate the tablet to a closed position. Once in the closed position, a magnet in the keyboard 100 is close enough in proximity to activate a sensor in the tablet 300, which sensor then instructs the tablet to enter a power-saving mode. The tablet support apparatus may include a "timeout" feature in which, after a period of inactivity, the tablet support apparatus also enters a power-saving mode.

The front of the keyboard 100 may also include additional material (not shown), such as steel weights in the frame 110, to provide additional stability when the tablet 300 is rotated past 90°. This extra weight will help prevent weight of the tablet 300 causing the keyboard 100 to tip backwards.

The inserts 230 may also include magnetic material (not shown) embedded in the insert. Contemplated within the scope of the invention are Neodymium magnets which could be embedded in the insert 230, formed as part of the inserts or as part of a pair of clamping fingers 210, 220. The additional magnetic material can function to provide a more secure connection between the tablet 300 and the clamping fingers 210, 220, reducing the likelihood that the tablet will unintentionally slip out of the clamping fingers.

Once the tablet 300 is in proximity to the tablet support apparatus 10, the tablet can be paired with the tablet support apparatus 10 through the one or more wireless modules. For example, once inserted into the clamping fingers 210, 220, the tablet 300 can be instructed through a touch screen or other means to cause the tablet to pair with the tablet support apparatus 10. The tablet support apparatus 10 can include a dedicated pairing button or switch to cause the tablet 300 to pair with the tablet support apparatus. More preferably, there is no dedicated pairing button on the tablet support apparatus 10, but a keystroke or combination of keystrokes on the keyboard 100 instructs the tablet 300 to pair with the tablet support apparatus via the one or more wireless modules.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for supporting a device comprising:
a keyboard;
a frame; and
a first device receiving member pivotally connected to the frame,
wherein the first device receiving member includes first and second clamp surfaces defining a generally "U"-shaped recess, the first clamp surface configured to receive a front portion of the device, and the second clamp surface configured to receive a back portion of the device opposite the front portion of the device,
wherein the first device receiving member includes a rounded base portion connecting the first clamp surface to the second clamp surface, the device receiving member being capable of rotation between a closed position and an open position, and
wherein the rounded base portion of the first device receiving member protrudes beyond a bottom portion of the frame when in the open position but does not protrude beyond the bottom portion of the frame when in the closed position.

2. The apparatus of claim 1, further comprising an insert, the insert configured to mate with the first device receiving member, wherein a portion of the insert, when mated to the first device receiving member, resides within the "U"-shaped recess between the first and second clamp surfaces.

3. The apparatus of claim 1, further comprising a second device receiving member pivotally connected to the frame, wherein the second device receiving member includes first and second clamp surfaces defining a generally "U"-shaped recess, the first clamp surface configured to receive a front portion of the device, and the second clamp surface configured to receive a back portion of the device opposite the front portion of the device.

4. The apparatus of claim 3, further comprising a first insert and a second insert, the first insert configured to mate with the first device receiving member and the second insert configured to mate with the second device receiving member, wherein a portion of the first insert, when mated to the first device receiving member, resides within the "U"-shaped recess between the first and second clamp surfaces of the first device receiving member, and further wherein a portion of the second insert, when mated to the second device receiving member, resides within the "U"-shaped recess between the first and second clamp surfaces of the second device receiving member.

5. The apparatus of claim 4, wherein each insert has a textured surface.

6. The apparatus of claim 4, wherein a bottom surface of the frame includes a first depression for mounting the first device receiving member to the frame and a second depression for mounting the second device receiving member to the frame.

7. The apparatus of claim 4, wherein a top surface of the frame includes a first depression shaped to receive a portion of the first device receiving member and a second depression shaped to receive a portion of the second device receiving member.

8. The apparatus of claim 1, wherein the first device receiving member includes a hinge comprising a support plate, a shaft, and a female host, wherein the female host is configured to receive a shaft.

9. The apparatus of claim 8, wherein the shaft is generally cylindrical and has a first flattened portion, and wherein the female host is generally cylindrical and has a first flattened portion.

10. The apparatus of claim 9, wherein the shaft further has a second flattened portion, the first and second flattened portions of the shaft being positioned approximately 90° from each other, and wherein the female host has a second flattened portion, the first and second flattened portions of the female host being positioned approximately 90° from each other.

11. An apparatus for supporting a tablet type computer comprising:
a keyboard;
a frame; and
a first tablet receiving member pivotally connected to the frame by a first hinge,
wherein the first tablet receiving member includes a first clamp surface having a first height and a second clamp surface having a second height, the first and second clamp surfaces defining a first generally "U"-shaped recess therebetween, wherein the first "U"-shaped recess is configured to receive a portion of the tablet such that the first clamp surface covers a portion of a front surface of the tablet and the second clamp surface covers a portion of a back surface of the tablet opposite the first surface of the tablet
wherein the first height is smaller than the second height, and
wherein the first tablet receiving member includes a rounded base portion and further wherein the first tablet receiving member is capable of rotation between a closed position and an open position, the rounded base portion of the first tablet receiving member protruding beyond a bottom portion of the frame when in the open position but not protruding beyond the bottom portion of the frame when in the closed position.

12. The apparatus of claim 11, wherein the first hinge includes a locking mechanism having an engaged state and a disengaged state, wherein upon rotation of the first tablet receiving member about the frame, the first hinge provides a first amount of friction when the locking mechanism is in the disengaged state and the first hinge provides a second amount of friction when the locking mechanism is in the engaged state, the second amount of friction being greater than the first amount of friction.

13. The apparatus of claim 11, further comprising an insert being configured to slip over the first tablet receiving member and to provide a compression fit with the tablet when the tablet is received within the first tablet receiving member.

14. The apparatus of claim 11, further comprising a wireless module within the frame, the wireless module being configured to transmit information between the keyboard and the tablet.

15. The apparatus of claim 11, wherein a bottom surface of the frame includes a first depression for mounting the first tablet receiving member to the frame.

16. The apparatus of claim 11, wherein a top surface of the frame includes a first depression shaped to receive a portion of the first tablet receiving.

17. A tablet type computer system comprising:
a tablet;
a keyboard;
a frame;
a first tablet receiving member pivotally connected to the frame by a first hinge, the first tablet receiving member having first and second clamping fingers extending substantially parallel to one another and coupled to one another by a first rounded base, the first clamping finger, second clamping finger, and first rounded base defining a first generally "U"-shaped recess configured to receive the tablet so that the first finger covers a portion of a front surface of the tablet and the second finger covers a portion of a back surface of the tablet opposite the first surface of the tablet, wherein the first clamping finger has a height that is smaller than a height of the front surface of the tablet, the second clamping finger has a height that is smaller than a height of the back surface of the tablet, and the height of the front clamping finger is smaller than the height of the second clamping finger, and wherein the first tablet receiving member is capable of rotation between a closed position and an open position, the first rounded base of the first tablet receiving member protruding beyond a bottom portion of the frame when in the open position but not protruding beyond the bottom portion of the frame when in the closed position.

18. The apparatus of claim 17, wherein the first hinge includes a locking mechanism having an engaged state and a disengaged state, wherein upon rotation of the first tablet receiving member about the frame, the first hinge provides a first amount of friction when the locking mechanism is in the disengaged state and the first hinge provides a second amount of friction when the locking mechanism is in the engaged state, the second amount of friction being greater than the first amount of friction.

19. The apparatus of claim 1, wherein the first clamp surface extends a first distance from the rounded base portion and the second clamp surface extends a second distance from the rounded base portion, the first distance being smaller than the second distance.

20. The apparatus of claim 11, further comprising
a second tablet receiving member pivotally connected to the frame by a second hinge, wherein the second tablet receiving member includes a third clamp surface having a third height and a fourth clamp surface having a fourth height, the third and fourth clamp surfaces defining a second generally "U"-shaped recess therebetween, wherein the second "U"-shaped recess is configured to receive a portion of the tablet such that the third clamp surface covers a portion of the front surface of the tablet and the fourth clamp surface covers a portion of the back surface of the tablet, and
wherein the third height is smaller than the fourth height.

21. The apparatus of claim 1, wherein the open position of the device receiving member includes a range of about 180 degrees of rotation.

22. The apparatus of claim 11, wherein the open position of the device receiving member includes a range of about 180 degrees of rotation.

23. The apparatus of claim 1, wherein, when the device receiving member is in the open position, the keyboard is configured to be inclined relative to a flat surface supporting the apparatus.

24. The apparatus of claim 11, wherein, when the device receiving member is in the open position, the keyboard is configured to be inclined relative to a flat surface supporting the apparatus.

* * * * *